United States Patent Office
3,236,262
Patented Feb. 22, 1966

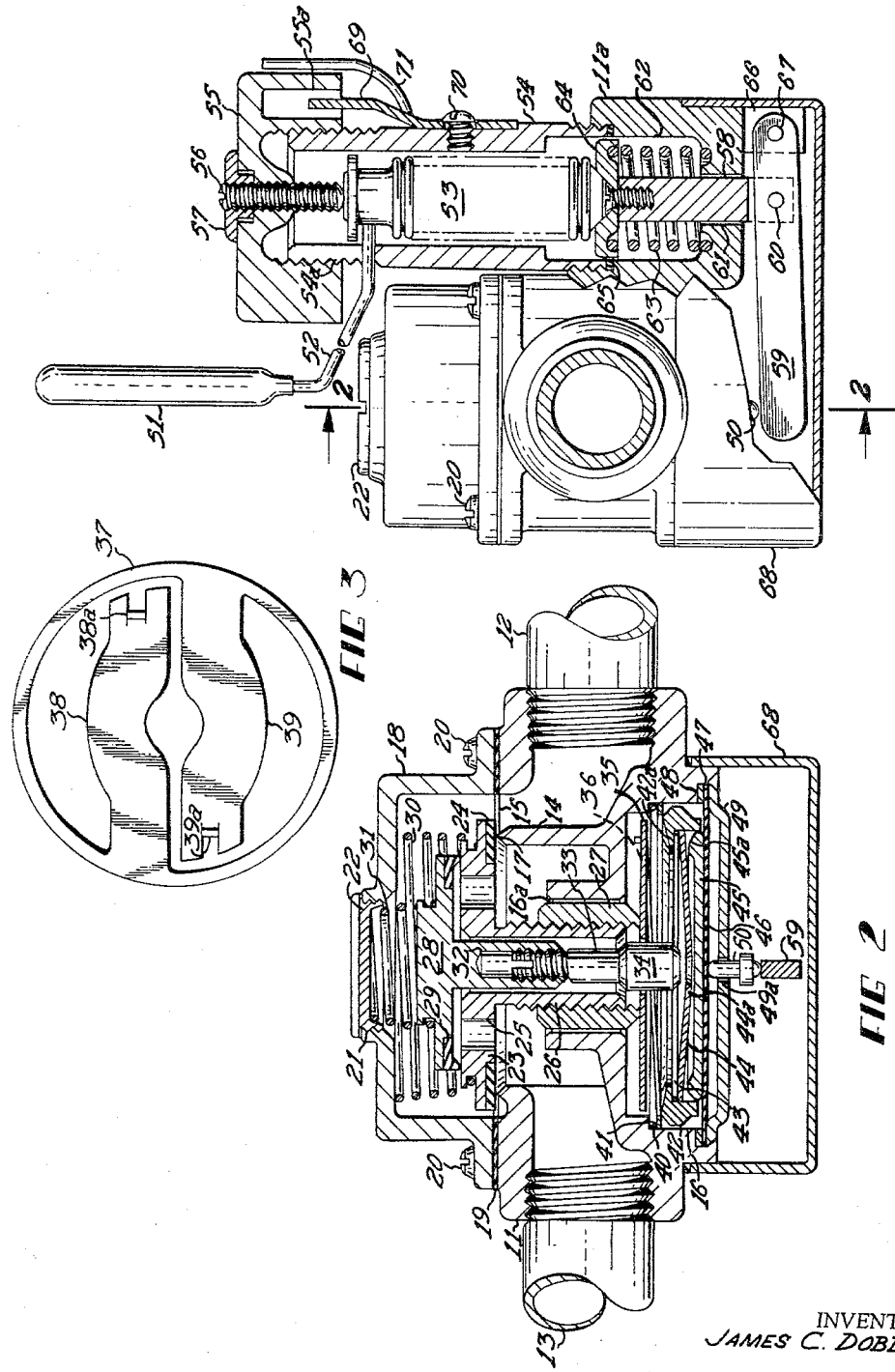

3,236,262
STEP OPENING DUAL VALVE
James C. Dobbin, Inglewood, Calif., assignor to Honeywell Inc., a corporation of Delaware
Filed Dec. 31, 1962, Ser. No. 248,581
7 Claims. (Cl. 137—630.15)

This invention relates to thermostatic gas valves and, more particularly, to an actuating mechanism for a thermostatic step-opening gas valve wherein motion amplification means is positioned between the power means and the valve operated thereby.

In thermostatic valves of the above-mentioned type, it is highly desirable to provide for substantial movement of a valve controlling the gas flow through the valve body, in response to movement of a temperature sensing power unit which inherently provides small movement of its power output shaft.

It is an object of this invention to provide a simple yet sturdy motion amplification means between the power operator and the main control valve of a gas valve of the above-mentioned type.

It is another object of the invention, to provide, in a double valve arrangement, a snap-acting mechanism for one of the valves and a motion amplification means between the snap-acting means and a second of the valves.

Another object of the invention is to provide a step-opening thermostatic gas valve wherein a power unit operated by a flame sensing unit is arranged to snap a smaller of two valves to its open position to provide gas for ignition purposes and, thereafter, to move a motion amplification means to open a second and larger valve to control the main flow of gas through the valve body.

Still other objects of the invention will become apparent upon reading the following detailed description of the invention in conjunction with the accompanying drawings, wherein:

FIGURE 1 is an end elevational view of the invention, with portions thereof broken away;
FIGURE 2 is a cross-sectional view of the invention taken along line 2—2 of FIGURE 1; and
FIGURE 3 is a plan view of a motion amplification actuator for one of the valves.

The invention comprises a valve body 11 having a threaded inlet 12, a threaded outlet 13, a partition wall 14 between said inlet and outlet, an opening 15 in the top of the valve body, and a stepped bore through the bottom of the valve body. The upper edge of the partition wall 14 is bevelled on each side thereof to provide a knife edge valve seat 17, substantially in line with the upper surface of the valve body.

Positioned over the top of the valve body 11, is an inverted cup-shaped cover 18, with a sealing gasket 19 therebetween. The cover 18 is secured to the body 11 by means of bolts 20. An internally threaded opening 21 in the cover is closed by an externally threaded plug 22.

A large disc valve 23 is positioned over the valve seat 17 and has a rubber washer 24 in the lower edge thereof that is adapted to cooperate with the seat 17 to control the main flow of gas through the valve body. The valve 23 has a plurality of apertures 25 therethrough to provide for the flow of a minimum quantity of gas through the valve body when there is no obstruction to flow therethrough. The valve also has a downwardly extending hollow stem 26 that is externally threaded and is adjustably screwable into an internally threaded sleeve-like valve stem extension 27. The extension is vertically slideable through the upper portion 16a of the stepped bore 16 to guide the valve 23 into and out of engagement with the valve seat 17.

A smaller disc valve 28 is positioned above the valve 23 and has an annular sealing member 29 in the lower surface thereof that is adapted to engage the upper surface of the disc valve 23, around and outwardly of the aperture 25, to prevent the flow of gas through these apertures 25 when the sealing member is in engagement with the disc valve 23. A large compression spring 30 normally biases the disc valve 23 against valve seat 17, while a smaller compression coil spring 31 extends between the plug 22 and the smaller valve 28 to normally bias that valve into engagement with the valve 23. The valve 28 has a downwardly extending, hollow and internally threaded stem portion 32, into which is threaded an externally threaded stem extension 33. Extension 33 has an enlarged diameter head portion 34 at its lower end for engagement by an actuating means therefor.

Surrounding the head 34, in slightly spaced relationship therewith, and in abutting relationship with the end of the sleeve extension 27, is a relatively stiff washer-shaped motion transmitting member 35 having a pair of diametrically-opposed, parallel slots 36 therein (one shown) for actuating the large valve 23. Positioned below the member 35, is a larger diameter ring-like disc 37 having a pair of generally parallel arms 38 and 39 extending from opposite sides of the ring to a point spaced a short distance from the other side of the ring. The member 37 bears at its periphery against a round (in cross-section) ring 40 which serves as a pivot for the ring 37 and which in turn bears against a shoulder 41 within the stepped recess or bore 16. The arms 38 and 39 serve as motion amplifying levers, in that upwardly struck fingers 38a and 39a extend upwardly and substantially centrally through the slots 36 in the washer 35. An annular movable fulcrum member 42 has an annular knife edge pivot portion which engages the levers 38 and 39 at points spaced a slight distance inwardly from the inner diameter of the ring-shaped member 37. It is thus seen that upon movement of the fulcrum member 42 upwardly, as viewed in FIGURE 2 of the drawing, a slight movement of the fulcrum member will be greatly amplified by the fingers 38a and 39a. Therefore, a slight movement of the fulcrum member 42 will cause substantial movement of the washer 35 and the valve 23 in abutment therewith.

Positioned within the fulcrum member 42 and bearing against a fulcrum ring 43 which, in turn bears against an inwardly extending annular flange 42a, is a conventional snap-action disc 44 having radially inwardly extending snap-action fingers 44a that terminate under the head portion 34 of the valve 28. This snap disc 44 is adapted to be actuated by a second movable fulcrum member 45 that has an annular knife-edge fulcrum portion 45a.

A metallic sealing diaphragm 46 is clamped against a sealing washer 47, resting against a shoulder 48 of the stepped bore or recess 16, and is held in this position by a disc 49 that is staked in sealing engagement against the diaphragm. The disc 49 has an aperture 49a therein through which extends a motion transmitting plunger 50.

The means for actuating the valve actuating mechanism through the plunger 50, consists of a remote bulb 51 connected through a capillary tube 52 to a conventional bellows 53. The capillary tube 52 extends through slot 54a in a threaded tube or sleeve 54 and into the upper end of the bellows. The bellows is longitudinally adjustable in the upper end of the sleeve 54 by means of an internally threaded adjustment knob 55 threaded on the upper end of the tube 54. Calibration screw 56 is threaded into a centrally threaded bore in the knob 55 and into abutting relationship with the upper end of the bellows 53. It is clamped in that position by means of a clamping nut 57.

The lower end of the bellows 53 bears against a plunger 58 which, in turn, is connected pivotally to a lever 59 by means of a pivot 60. The plunger 58 extends through a bore 61 in the bottom of a recess 62 in the side extension 11a of the valve body. A coil compression spring 63 extends from the bottom of the recess 62 and into engagement with the under surface of a spring retainer washer 64 clamped to the upper end of the plunger 58 by means of a screw. The lower end of the sleeve 54 is screw-threaded into the upper end of the recess 62 and into sealing engagement with a lock washer 65. The lever 59 is pivoted to a boss 66 on the underside of the body extension 11a by means of a pivot 67 and bears at its other end against the lower end of the plunger 50. The lever 59 and plunger 50 are enclosed by a generally cup-shaped cover member 68 which may be secured in any suitable manner to the valve body 11, as by a friction fit therewith.

To aid in confining the movement of the control knob 55, between certain limits, an arcuate groove is formed in the under-side of the knob 55 so that the ends thereof will cooperate with a stop arm 69 secured to the tube 54 by means of a bolt 70. A second arm 71 extends from the stop arm 69 outwardly beyond and along the side of the knob 55 to cooperate with indicia (not shown) on the knob to indicate the position of the knob 55 at any selected temperature setting.

*Operation*

The valve is shown in its closed condition, that is, with both the large or main valve 23 closed and the minimum flow or smaller valve 28 also closed. With a fall in temperature around the bulb 51, the fluid in the bulb 51, capillary tube 52, and bellows 53, will contract and permit the coil spring 63 to lift the plunger 58, the lever 59, and the motion transmitting or actuation plunger 50. As the plunger 50 rises, it will actuate the diaphragm 46 and movable fulcrum 45 upwardly until the snap disc 44a snaps over center to engage the stem head 34 and quickly open the valve 28. This will establish a minimum flow of gas from the inlet 12, past the valve 28 and through the apertures 25 to the outlet 13, to assure proper ignition of a burner connected to the outlet 13.

Following the lifting of the valve 28, any further or additional movement of the plunger 50 in the upwardly direction, will cause the annular fulcrum member 42 to move upwardly and pivot the arms 38 and 39, to lift the member 35 and the valve 23. The degree of movement of the valve 23 will then vary between its off (minimum flow) position and full open position depending upon the heat demand.

As the temperature around the bulb 51 rises, the main valve 23 will close first, followed by the snapping-closed of the valve 28 from its open (minimum flow) position to its off position. This assures safe operation of the main burner.

From the above description of the operation of the invention, it can be readily seen that a very compact valve operating mechanism has been provided that will provide relatively wide valve operating movement with respect to the small amount of movement provided by the temperature responsive power means and as compared with prior art arrangements for providing similar operation. As modifications may be made in the invention without departing from the spirit thereof, the scope of the invention should be determined from the appended claims.

I claim:

1. An actuating mechanism for a pair of valves comprising a housing having a recess therein, a member for actuating a first one of said valves, a pair of levers each having one end thereof pivoted in said recess adjacent a side wall of said recess and each having a free end thereof bearing against said member near an opposite portion of said side wall, a movable fulcrum member having spaced fulcrum points respectively engaging said levers near said pivoted ends, means having a first portion thereof pivotally engaging said movable fulcrum member and having a second portion thereof adapted to engage a second one of said valves, and an actuator for said means arranged to first move said means with respect to said movable fulcrum member to open said second valve and then to move said movable fulcrum member to actuate said levers to open said first valve.

2. An actuating mechanism for a pair of valves comprising a housing having a recess therein, an apertured member for actuating a first one of said valves, a pair of levers each having one end thereof pivoted in said recess adjacent a side wall of said recess and each having a free end thereof bearing against said member near an opposite portion of said side wall, a movable fulcrum member having an aperture therethrough and having spaced fulcrum points respectively engaging said levers intermediate their ends and near the pivoted ends, snap-action means having a first portion thereof pivotally engaging said movable fulcrum member and having a second portion thereof positioned to engage a second valve through the aperture in said movable fulcrum member, and an actuator operably engaging said means so as to first move said snap-action means with respect to said movable fulcrum member to open said second valve and then to move said movable fulcrum member to actuate said levers to open said first valve.

3. In an actuating mechanism for a pair of valves, the combination comprising a housing having a stepped bore therein, a washer for actuating one of said valves, a pair of levers each having one end thereof pivoted in said stepped bore adjacent a side wall of said bore and each having a free end thereof bearing against said washer near an opposite portion of said side wall, a movable fulcrum member having an aperture therethrough and having spaced fulcrum points respectively engaging said levers intermediate their ends, snap-action means having a first portion thereof pivotally engaging said movable fulcrum member and having a second portion thereof positioned to engage a second one of said valves through the aperture in said movable fulcrum member, and an actuator operably arranged with respect to said snap-action means so as to first move said snap-action means with respect to said movable fulcrum member to open said second valve and then to move said movable fulcrum member to actuate said levers to open said first valve.

4. A gas valve comprising a valve body having an inlet and an outlet and a valve seat therebetween, said body having an opening through the bottom thereof and in alignment with said valve seat, a large valve having a hollow stem extending through said valve seat and into said opening and having a flow aperture therethrough, means biasing said large valve towards said seat, a smaller valve having a stem extending through said hollow stem and said opening, means biasing said smaller valve towards said large valve to close said flow aperture when in engagement with said large valve, an actuating member in said opening and in abutting engagement with the stem of said large valve, motion amplifying means in said opening and abutting said actuating member, snap-action means positioned in said opening and having a first portion in pivotal engagement with said motion amplifying means and a second portion positioned to engage and to actuate the stem of said smaller valve, and power means for actuating said snap-action means, the biasing on said valves being such that said snap-action means will first open said smaller valve through said second portion thereof before additional movement of said snap-action means by said power means will cause opening of said large valve through said first portion thereof.

5. A gas valve comprising a valve body having an inlet and an outlet and a valve seat therebetween, a stepped bore extending through the bottom of said valve body and concentric with said valve seat, a first valve having a hollow stem extending through said valve seat and into said stepped bore and having a flow aperture therethrough, means biasing said first valve towards said seat, a second valve having a stem extending through said hollow stem, means biasing said second valve towards said first valve to close said flow aperture when in engagement with said first valve, an actuating member in said stepped recess surrounding said second valve stem and in abutting engagement with said hollow stem, motion amplifying means in said stepped recess and abutting said actuating member, snap-action means in said recess having a first portion thereof in pivotal engagement with said motion amplifying means and having a second portion thereof adapted to actuate the stem of said second valve, and power means for actuating said snap-action means, the biasing on said valves being such that said snap-action means will first open said second valve before additional movement of said snap-action means by said power means will cause opening of said first valve.

6. A thermostatic control device comprising a valve body having an inlet and an outlet and a valve seat therebetween, said body having a stepped bore extending through the bottom thereof and concentric with said valve seat, a large valve having a hollow stem extending through said valve seat and into said stepped bore and having a flow aperture therethrough, resilient means biasing said large valve towards said seat, a smaller valve having a stem extending through said hollow stem, resilient means biasing said smaller valve towards said large valve to close said flow aperture when in engagement with said large valve, an apertured member in said stepped recess and surrounding said smaller valve stem and in abutting engagement with said hollow stem, pivoted lever motion amplifying means in said stepped recess and abutting said apertured member, snap-action means in said recess having a first portion thereof in pivotal engagement with said motion amplifying means and having a second portion thereof adapted to actuate the stem of said smaller valve, and power means for actuating said snap-action means, the biasing on said valves being such that said snap-action means will first open said smaller valve before additional movement of said snap-action means by said power means will cause opening of said large valve.

7. The combination comprising a valve body having an inlet and an outlet and a valve seat therebetween, said body having a stepped bore extending through the bottom thereof and generally in alignment with said valve seat, a first valve having a hollow stem extending through said valve seat and into said stepped bore and having a flow aperture therethrough, means biasing said first valve towards said seat, a second valve having a stem extending through said hollow stem, means biasing said second valve towards said first valve to close said flow aperture when in engagement with said first valve, an apertured member in said stepped recess surrounding said second valve stem and in abutting engagement with said hollow stem, an annular ring having a pair of oppositely extending and generally parallel arms in said stepped recess and abutting said member at their free ends, snap-action means in said recess having a first portion thereof in pivotal engagement with said motion amplifying means and having a second portion thereof adapted to actuate the stem of said second valve, and power means for actuating said snap-action means, the biasing on said valves being such that said snap-action means will first open said second valve before additional movement of said snap-action means by said power means will cause opening of said first valve.

References Cited by the Examiner
UNITED STATES PATENTS

| | | | |
|---|---|---|---|
| 2,236,908 | 4/1941 | Jackson | 236—48 |
| 2,656,984 | 10/1953 | Caparone | 236—48 X |
| 2,843,323 | 7/1958 | Dobbin | 236—48 |
| 2,991,012 | 7/1961 | Wright. | |
| 3,118,471 | 1/1964 | Wright | 251—75 X |
| 3,190,314 | 6/1965 | Visos et al. | 137—630.15 |

FOREIGN PATENTS 929,162   6/1955   Germany.

ISADOR WEIL, *Primary Examiner.*

WILLIAM F. O'DEA, *Examiner.*

J. O'NEILL, A. COHAN, *Assistant Examiners.*